UNITED STATES PATENT OFFICE.

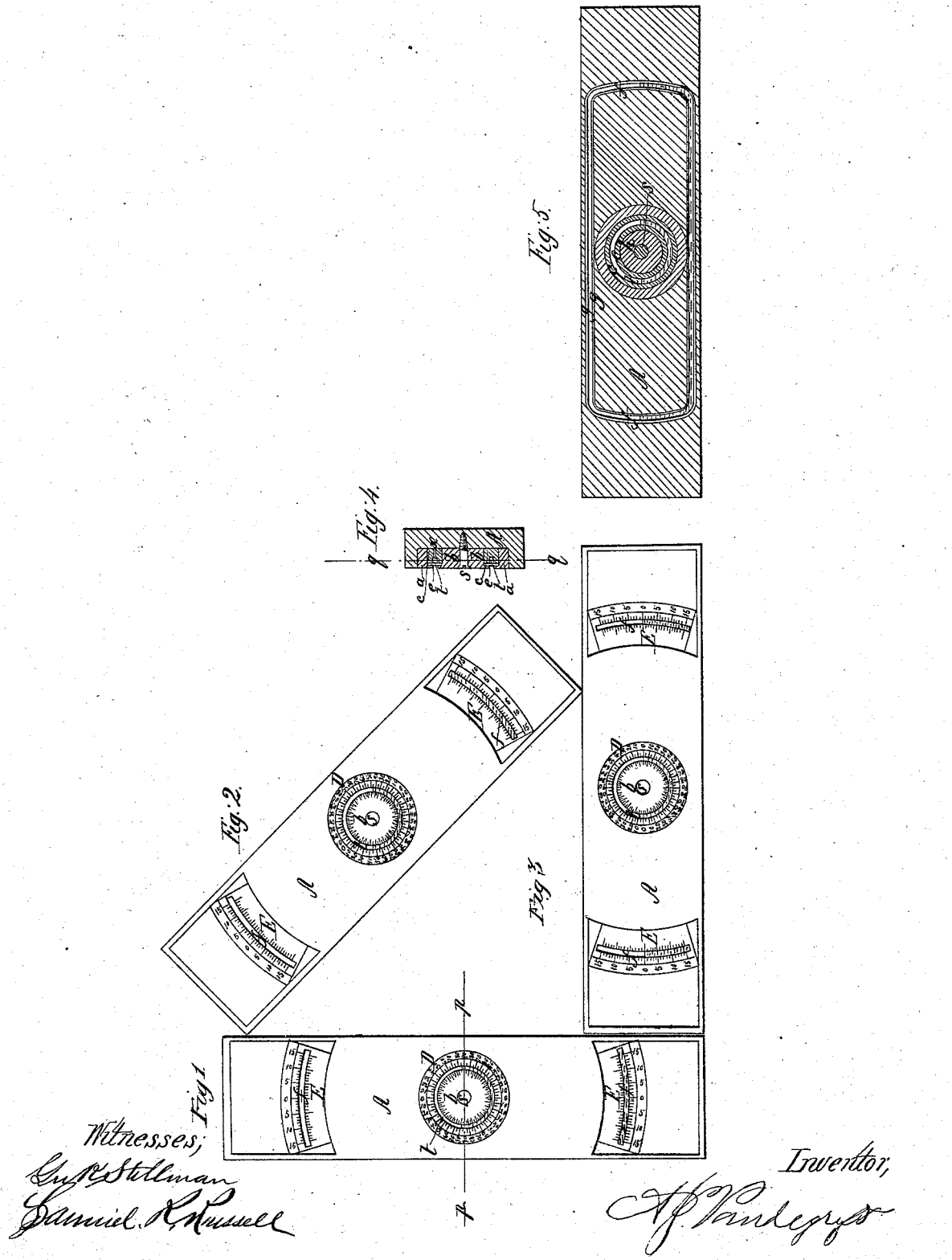

ANDREW J. VANDEGRIFT, OF CINCINNATI, OHIO.

IMPROVEMENT IN SPIRIT-LEVELS.

Specification forming part of Letters Patent No. 54,626, dated May 8, 1866; antedated April 25, 1866.

*To all whom it may concern:*

Be it known that I, ANDREW J. VANDEGRIFT, of the city of Cincinnati, county of Hamilton, and State of Ohio, have invented new and useful Improvements in Liquid-Levels; and I do hereby declare that the following is a full, clear, and exact description of the same, reference being had to the annexed drawings, making a part of this specification, in which—

Figures 1, 2, and 3 are front elevations, showing the instrument in different positions. Fig. 4 is a section taken in lines $p\ p$, Fig. 1. Fig. 5 is a section taken in lines $q\ q$, Fig. 4.

Similar letters of reference indicate corresponding parts wherever they may occur in the several figures.

This invention relates to that class of instruments used for the purpose of indicating the level and all degrees of elevation from a horizontal to a perpendicular, in which the law of equilibrium of liquids is the ruling principle. These instruments as heretofore constructed are imperfect in several particulars: first, in being made to depend upon a bubble settling to the highest point of elevation in a curved tube, in which case a very slight imperfection in the construction renders accuracy out of the question; secondly, in not being so constructed as to indicate with equal accuracy all angles, from a horizontal to a perpendicular, without the use of cumbersome external adjustable devices. The object of the within-described invention is to obviate these imperfections by an accurate, simple, compact instrument.

My invention consists in the use of a universal circular liquid-chamber, formed by a peculiar construction, partially filled with liquid, and so arranged in relation to a dial-plate that when the instrument is placed on a level surface the liquid in the chamber, which virtually forms two perpendicular columns, stands with its surface at the level-line marked on the dial-plate on either side 0; but if either end of the instrument be elevated or depressed the surface of the liquid will remain level, and its relative position to that of the dial-plate will indicate the degree of such elevation or depression, which may vary from one degree to ninety degrees. I also use in the same instrument, though on the same principle, a circuitous capillary tube, which is so constructed as to describe a segment of a circle at its two extremes, which, forming a circuit, and being also partially filled with liquid, and being properly arranged in relation to segmentary dial-plates, serve the purpose of very accurately indicating slight elevations or depressions.

To enable others skilled in the art to fully understand and construct my invention, I will proceed to describe it.

A, Figs. 1, 2, 3, 4, and 5, is the body or stock of the instrument.

D, Figs. 1, 2, and 3, is a dial-plate, having the degrees in the circle properly marked and numbered.

$t$, Figs. 1, 2, 3, 4, and 5, is a universal circular liquid-chamber, upon the perfection of the uniform mechanical construction of which depends the accuracy of the instrument. This circular chamber is designed to be charged to precisely half of its capacity with colored liquid, and may be constructed as a capillary chamber or otherwise; in fact, a glass tube may be bent to form a circle charged with liquid and hermetically sealed and used, though not to a good purpose, on account of unavoidable irregularities, caused by bending, connecting, sealing, &c. This chamber should be made perfectly uniform, so that no matter in what position the instrument may stand the liquid will stand precisely up to a line drawn horizontally through the center of the circle described by it. I therefore form this chamber by a circular groove, in metal or other suitable material, and provide it a transparent face in the following manner:

$a\ a$, Fig. 4, is a ring formed with an inward projection. $b\ b$ is a center piece formed with a corresponding outward projection, against which is placed a transparent face-plate, $e\ e$, Fig. 4, made from mica, glass, or other suitable material. In the process of construction this face-plate should be fitted in with a ground joint, and then bedded in with a thin film of gutta-percha, red or white lead, or some other suitable substance to form a cement to prevent the possibility of leakage. This being properly done, ring $c\ c$, Figs. 4 and 5, should be properly formed to fit neatly between ring $a\ a$, Fig. 4, and center $b\ b$ ditto, and having the groove formed in its face, which constitutes universal circular liquid-chamber $t$, Figs. 1, 2, 3, 4, and 5, should be made of white metal, or said liquid-chamber should be lined with some white substance in order to form a contrast between the liquid and the metal more striking than is otherwise the case. This being done, ring c c, Fig. 4, should be placed and pressed firmly to its place, and soldered firmly to its place in such a manner as to prevent possibility of leakage.

The construction of the device being thus complete, and being provided with an aperture, x, Fig. 4, communicating through the back of ring c c, Fig. 4, with universal circular liquid-chamber t t, for the purpose of allowing the insertion of the liquid, the chamber should be charged with liquid to precisely one-half its capacity and the aperture closed and hermetically sealed. The device being complete, should be properly set into the stock A, as shown plainly in Fig. 4, and screwed firmly to its place by screw s. The instrument, so far as this device is concerned, is ready for use; but in order to obtain the advantages of a larger circle I have added an additional circuitous capillary tube describing a segment of a circle at its two extremes. This tube is marked g g, and is shown plainly in Fig. 5. This tube is also charged with colored liquid, and forming a complete circuit, is hermetically sealed, is properly let in from the back of stock A, Figs. 1, 2, 3, 4, and 5, in such a manner as to be visible through slotted openings f f in segmental dial-plates E E, Figs. 1, 2, and 3.

The instrument thus constructed is practically operated as follows: If it be required to ascertain whether or not a plane is level the instrument is placed on the same, as shown in Fig. 3, and if it prove to be level the liquid will so indicate by standing up to marks marked on dial-plates 0; but if the surface should be an incline rather than a level the number of degrees of inclination will be indicated by the liquid standing to corresponding marks on the dial plate or plates. If it be less than fifteen degrees of an angle, it will be very accurately indicated by the segmental or sectional dial-plates E E, the single degrees being marked thereon; but if the angle be greater than will come within the range of said sectional dial-plates it will be indicated sufficiently accurate for all ordinary practical purposes by dial-plate D, as shown plainly in Fig. 2, standing at an angle of forty-five degrees, or, as shown by Fig. 2, standing at ninety degrees, or used for a plumb.

I am aware that curved tubes have been bent and used, in connection with marked plates, for the purpose of indicating angles by the means of being so arranged as to have a bubble settle to certain marks. This mode, as heretofore described, is inaccurate on account of the impossibility of perfect construction of the chamber being attainable in that way; but if said chamber be constructed in metal and provided with transparent face it can be made perfect, and an arc or section of a circle so made can be used in the manner above described with a bubble, or a bubble may be used in a universal circle to a good purpose; but so long as the chamber is constructed by being formed in metal or other suitable material and provided with a transparent face, substantially as herein described, and used in connection with a dial-plate or a section of a dial-plate, substantially in the manner herein set forth and described, I shall consider it an infringement upon my invention.

Having thus fully described the construction and operation of my invention, what I claim therein as new, and desire to secure by Letters Patent, is—

1. Forming liquid-chamber t by turning or otherwise forming a uniform groove in metal or other suitable material, and providing the same with a transparent face, the same being fitted and hermetically sealed, forming a uniform liquid-chamber, substantially in the manner and for the purpose set forth.

2. Stock A, liquid-chamber t, circuitous liquid-chamber g g, dial-plate D, and segmental dial-plates E E, all combined in the manner and for the purpose set forth.

A. J. VANDEGRIFT.

Witnesses:
GEO. K. STILLMAN,
SAMUEL R. RUSSELL.